(12) United States Patent
Mäder et al.

(10) Patent No.: US 9,809,115 B2
(45) Date of Patent: Nov. 7, 2017

(54) OPERATOR DROWSINESS DETECTION IN SURFACE MINES

(71) Applicant: SAFEMINE AG, Baar (CH)

(72) Inventors: Urban Mäder, Zürich (CH); Andrea Boris Schlapbach, Hausen am Albis (CH); Peter Spring, Thalwil (CH)

(73) Assignee: SAFEMINE AG, Baar (CH)

( * ) Notice: Subject to any disclaimer, the term of this patent is extended or adjusted under 35 U.S.C. 154(b) by 0 days.

(21) Appl. No.: 14/900,363

(22) PCT Filed: Jun. 26, 2014

(86) PCT No.: PCT/CH2014/000088
§ 371 (c)(1),
(2) Date: Dec. 21, 2015

(87) PCT Pub. No.: WO2015/000087
PCT Pub. Date: Jan. 8, 2015

(65) Prior Publication Data
US 2016/0137059 A1    May 19, 2016

(30) Foreign Application Priority Data
Jul. 3, 2013  (AU) ................................ 2013206671

(51) Int. Cl.
*B60K 28/06* (2006.01)
*G08B 21/06* (2006.01)
(Continued)

(52) U.S. Cl.
CPC ............ *B60K 28/066* (2013.01); *B60K 28/06* (2013.01); *B60Q 9/008* (2013.01); *B60W 40/08* (2013.01);
(Continued)

(58) Field of Classification Search
CPC .... G08B 21/06; A61B 5/18; A61M 2230/005; B60K 28/06; B60K 28/066; B60W 2530/14; B60W 40/08; B60Q 9/008
See application file for complete search history.

(56) References Cited

U.S. PATENT DOCUMENTS

| 5,465,079 A | 11/1995 | Bouchard et al. |
| 5,729,619 A | 3/1998 | Puma |

(Continued)

FOREIGN PATENT DOCUMENTS

| CN | 201765668 U | 3/2011 |
| CN | 102208125 A | 10/2011 |
| EP | 2605228 A2 | 6/2013 |

OTHER PUBLICATIONS

Akerstedt et al., Predictions From the Three-Process Model of Alertness, Aviation, Space and Environmental Medicine, vol. 75, No. 3, Section II, Mar. 2004.
(Continued)

*Primary Examiner* — Orlando Bousono
(74) *Attorney, Agent, or Firm* — Marshall, Gerstein & Borun LLP

(57) ABSTRACT

A method for deriving a fatigue score (100) indicative of a current drowsiness state of an operator (1) measures a plurality of signals (10, 20, 30, 40, 50, 60, 70, 80, 90) and derives a personalized fatigue score (100) for the operator using these signals (10, 20, 30, 40, 50, 60, 70, 80, 90) in a weighted and operator-personalized way.

25 Claims, 3 Drawing Sheets

(51) Int. Cl.
*B60Q 9/00* (2006.01)
*B60W 40/08* (2012.01)

(52) U.S. Cl.
CPC ..... *G08B 21/06* (2013.01); *B60W 2040/0827* (2013.01)

(56) References Cited

U.S. PATENT DOCUMENTS

| | | | | |
|---|---|---|---|---|
| 6,346,887 | B1* | 2/2002 | Van Orden | G08B 21/06 180/272 |
| 6,661,345 | B1 | 12/2003 | Bevan et al. | |
| 6,927,694 | B1 | 8/2005 | Smith et al. | |
| 7,183,932 | B2 | 2/2007 | Bauer | |
| 8,022,831 | B1 | 9/2011 | Wood-Eyre | |
| 8,708,884 | B1* | 4/2014 | Smyth | A61M 21/00 600/27 |
| 8,930,269 | B2 | 1/2015 | He et al. | |
| 9,198,575 | B1* | 12/2015 | Blacutt | G06K 9/00845 |
| 2002/0145512 | A1 | 10/2002 | Sleichter et al. | |
| 2003/0141762 | A1 | 7/2003 | Sartori et al. | |
| 2003/0151516 | A1* | 8/2003 | Basir | G08B 21/06 340/575 |
| 2004/0070509 | A1* | 4/2004 | Grace | A61B 5/1103 340/575 |
| 2005/0073136 | A1 | 4/2005 | Larsson et al. | |
| 2006/0012679 | A1 | 1/2006 | Ressler | |
| 2007/0182529 | A1 | 8/2007 | Dobler et al. | |
| 2007/0296601 | A1* | 12/2007 | Sultan | A61B 5/18 340/576 |
| 2008/0069403 | A1 | 3/2008 | Breed | |
| 2008/0231461 | A1* | 9/2008 | Sanchez | G08B 21/06 340/575 |
| 2009/0040054 | A1* | 2/2009 | Wang | B60W 30/095 340/576 |
| 2009/0066521 | A1* | 3/2009 | Atlas | A61B 5/18 340/575 |
| 2009/0115638 | A1 | 5/2009 | Shankwitz et al. | |
| 2009/0149770 | A1* | 6/2009 | Sing | A61B 5/04017 600/544 |
| 2010/0109881 | A1* | 5/2010 | Eskandarian | A61B 5/6887 340/575 |
| 2011/0043350 | A1* | 2/2011 | Ben David | B60Q 9/00 340/441 |
| 2011/0284304 | A1* | 11/2011 | Van Schoiack | B62D 1/046 180/272 |
| 2012/0139743 | A1* | 6/2012 | Rothacher | G01S 5/0072 340/686.6 |
| 2012/0169503 | A1 | 7/2012 | Wu et al. | |
| 2013/0176129 | A1 | 7/2013 | Li et al. | |
| 2014/0114532 | A1 | 4/2014 | Choi et al. | |
| 2014/0210625 | A1* | 7/2014 | Nemat-Nasser | B60K 28/066 340/575 |

OTHER PUBLICATIONS

Karjewski et al., Steering Wheel Behavior Based Estimation of Fatigue, Proceedings of the Fifth International Driving Symposium on Human Factors in Driver Assessment, Training and Vehicle Design.

Perclos: A Valid Psychophysiological Measure of Alertness as Assessed by Psychomotor Vigilance, Federal Highway Administration, Office of Motor Carriers, Publication No. FHWA-MCRT 98-006, Oct. 1998.

International Search Report for International Application No. PCT/CH2014/000088, dated Nov. 19, 2014.

\* cited by examiner

OPERATOR DROWSINESS DETECTION IN SURFACE MINES

CROSS-REFERENCE TO RELATED APPLICATIONS

This is the United States National Phase of International Patent Application No. PCT/CH2014/000088, filed Jun. 26, 2014, which claims priority to AU 2013206671, filed Jul. 3, 2013. The entirety of each of the foregoing priority applications is hereby incorporated by reference.

TECHNICAL FIELD AND BACKGROUND ART

The invention relates to methods and devices for operator drowsiness detection, in particular in surface mines.

Surface mines and similar sites or areas are generally operated by means of a large number of vehicles, some of which may be exceedingly large and difficult to control and have very limited visibility for the operator.

In case an operator of such a vehicle or other movable object in a surface mine becomes tired and/or falls asleep and possibly loses control over the vehicle, situations may occur in which the life of other persons working on site may be at risk or damages may occur at the vehicle or other objects on site.

DISCLOSURE OF THE INVENTION

Therefore, it is an object of the present invention to provide a method and a device for deriving a fatigue score which is indicative of a current drowsiness state of an operator.

This object is achieved by the method and devices of the independent claims.

Accordingly, a method for deriving a fatigue score which is indicative of a current drowsiness state of an operator comprises a step of measuring, by means of a first sensor, at least one machine control signal which is indicative of a control input from the operator to a machine. In other words, this machine control signals is indicative of how the operator "operates" or "runs" the machine. Thus, objective machine control inputs from the operator to the machine can be taken into account.

In the advantageous case that the operator is, e.g., a driver of a movable object (e.g., a truck) for example in a surface mine, the machine control signal advantageously comprises at least one of
- a steering input angle which is indicative of the current angle of the steering wheel,
- a brake pedal position which is indicative of whether and if yes optionally with which intensity the operator actuates the brake pedal or other deceleration control,
- a gas pedal position which is indicative of whether and if yes optionally with which intensity the operator actuates the gas pedal or other acceleration control,
- a retarder activation state which is indicative of whether and if yes at which intensity level the operator actuates the retarder,
- a turn indicator state which is indicative of whether and if yes on which side the operator activates the turn indicator, and
- a horn activation state which is indicative of whether and if yes for how long the operator blows the horn of the truck.

Multiple machine control signals can be combined. Thus, a plurality of machine control inputs can be taken into account which improves the reliability of the fatigue score prediction.

The method according to the invention furthermore comprises a step of measuring, by means of a second sensor, at least one operator signal which is indicative of a physiological and/or of a behavioral state of said operator. In contrast to the machine control signal discussed above, the operator signal does not relate to a technical aspect of the machine operation itself but instead to the physiology and/or behavior of the operator. Thus, not only objective machine control inputs but also personal aspects of the operator can be taken into account. This enhances the reliability of the prediction of the operator's current drowsiness state by means of the derived fatigue score.

The second sensor advantageously comprises one or more camera(s) for acquiring one or more image(s) of the operator (taken from one or more viewing angles) which is/are then processed for deriving the operator signal. Thus, a physiological and/or behavioral operator signal is more easily obtainable. The at least one operator signal is advantageously indicative of a behavioral state of said operator and in particular comprises at least one of the group of:
- an eyelid closing state which is indicative of whether and/or to which degree the operator has closed his eyelids,
- a mouth closing state which is indicative of whether and/or how much the operator has opened his mouth,
- a viewing direction which is indicative of the gaze direction of the operator,
- a head orientation of the operator,
- a focal point position which is obtainable by processing both eyes individually,
- a body posture, e.g., to which degree does the operator sit with a straight back, and
- a distraction level, e.g., does the operator use his mobile phone (as, e.g., also detectable by measuring a transmitted radio signal intensity from the phone) or does he read a newspaper while driving?

Physiological sensors can be foreseen which enable the monitoring of other operator signals: Then, the at least one operator signal is advantageously indicative of a physiological state of said operator and in particular comprises at least one of the group of:
- a pupil diameter,
- a blood pressure,
- a pulse rate,
- a body temperature,
- an electroencephalogram,
- a skin conductance level, and
- a blood glucose level
of the operator.

Multiple operator signals can also be combined. Thus, a plurality of physiological and/or behavioral states of the operator can be taken into account which enhances the reliability of the prediction of the operator's current drowsiness state.

In a more advantageous embodiment, at least two operator signals are measured and used for deriving the fatigue score (see below), i.e., at least one operator signal indicative of a physiological state and at least one operator signal indicative of a behavioral state. Thus, the reliability of the prediction of the operator's current drowsiness state by means of the fatigue score is enhanced.

The method according to the invention furthermore comprises a step of determining an operator identification signal for uniquely identifying said operator. In other words, the method according to the invention can take personal characteristics of the operator (such as a personalized fatigue model or a previous shift schedule) into account. This improves the precision of the fatigue score prediction.

Advantageously, this operator identification step comprises a receiving of a wireless transmission from a badge (e.g., an RFID badge) which is personalized for said operator and advantageously attached to the operator's clothing, helmet, or other equipment, and/or a reading (e.g., by a camera or a barcode scanner) of a badge which is personalized for said operator and advantageously attached to the operator's clothing, helmet, or other equipment, and/or an entering of a unique identification phrase (e.g., comprising a PIN and/or a passphrase) for said operator (e.g., by the operator on a keypad and/or a touchscreen attached to the machine), and/or a recognition of a physiological feature which is unique for said operator, in particular a facial feature and/or a fingerprint. Here, after a feature scanning step, suitable facial feature recognition or fingerprint recognition algorithms are used to uniquely identify the operator from a database (e.g., a remote database or a database located on a smartcard which can be attached to the operator's clothing, helmet, or other equipment).

A combination is possible as well. Thus the operator identification is facilitated. The operator identification can also be linked to a time registration system and/or a main machine switch.

The method according to the invention furthermore comprises a step of deriving, using said at least one machine control signal,
said at least one operator signal, and
said operator identification signal said fatigue score which is indicative of the current drowsiness state of said operator. In other words, by combining the machine control signal(s), the operator signal(s), and the operator identification signal, the fatigue score as a measure for "how tired the operator currently is" is derived. By combining a plurality of signals, a more reliable prediction of the operator's current drowsiness state is achieved via the derived fatigue score.

Advantageously, an acoustic and/or a tactile and/or a visual alarm signal is/are issued when said fatigue score increases above a threshold. Thus, e.g., the operator can be woken up again after falling into a microsleep during driving. As an option, also a break from work can automatically be proposed, e.g., on a display, by the system dependent on the predicted fatigue score.

In another advantageous embodiment, a warning signal can be transmitted by means of a transmitter, in particular to a base station, when said fatigue score increases above a threshold. Thus, operation control of the facility, e.g., the shift supervisor of the surface mine, is made aware of the hazard of a specific operator to fall asleep and suitable countermeasures can be foreseen before an accident happens, e.g., a wake-up call can be sent over VHF radio and/or instructions for taking a break can be communicated.

Advantageously, in the step of deriving the fatigue score, in addition to the described "current" signals (i.e., the signals that are currently acquired and/or derived, see below), also past datapoints from the same or a different signal (i.e., "previously stored signals") can be used, particularly in addition to the newly acquired and/or derived signals.

As an example, at a time n-1, an operator signal (which is a "currently acquired signal" at this time) is measured and stored in a memory. Then, for deriving the fatigue score at a later time n, this signal which is now—at the time n—termed "previously acquired signal" is retrieved from the memory for being used in the step of deriving the fatigue score in addition to the newly measured—at the time n—operator signal (which signal is one of the new "currently acquired signals").

Thus, a history of the signals can be taken into account which improves the reliability of the operator's current drowsiness state prediction by means of the derived fatigue score.

As it is obvious to the skilled person, suitable filtering and comparison methods such as, e.g., moving averages can be applied dependently or independently from using previously stored signals. Also a storage, later retrieval, and usage of derived fatigue score values itself is possible.

In another advantageous embodiment, the method comprises a further step of deriving at least one confidence level (i.e., indicative of a confidence, an accuracy, or a validity) for the underlying acquired and/or derived (see below) signal(s). This confidence level is then used in the step of deriving the fatigue score which improves the reliability of the operator's current drowsiness state prediction.

Dependent or independent from deriving and using the confidence level, at least one outlier can also be removed (i.e., not taken into account for the step of deriving the fatigue score) from at least one of the acquired and/or derived (see below) signals.

In yet another advantageous embodiment, the method step of deriving said fatigue score comprises a weighing of at least one, in particular at least two, in particular all, acquired and/or derived (see below) signal(s). Thus, different signals such as the machine control signal and/or the operator signal can contribute differently (optionally also in a personalized manner, i.e., dependent on the operator identification signal) in the derivation of the fatigue score. The use of different (optionally personalized) weighing factors improves the reliability of the operator's current drowsiness state prediction.

In another advantageous embodiment of the method, in addition to the machine control signal, the operator signal, and the operator identification signal, an additional navigation signal is used in the step of deriving the fatigue score. In this embodiment, the operator is an operator of a movable object, in particular in a surface mine, and the method comprises a further step of measuring, by means of a third sensor (advantageously a GPS receiver or another GNSS), at least one navigation signal of said movable object. This navigation signal is in particular indicative of at least one of the group of a position,
a velocity,
an orientation, and
a yaw rate
of the movable object.

By taking into account the navigation signal, the reliability of the operator's current drowsiness prediction by means of the derived fatigue score can be improved. As an example, it can be a hint for a drowsy driver if the movable object performs a plurality of accelerations and decelerations shortly after each other.

In yet another advantageous embodiment of the method, in addition to the machine control signal, the operator signal, and the operator identification signal, an additional environment signal is used in the step of deriving the fatigue score.

This environment signal is—in an additional method step—measured by means of a fourth sensor—and in particular indicative of at least one of the group of
- a light level,
- a noise level,
- a temperature, and
- an air humidity level, in the environment and/or in or around a cabin of the operated machine or the operator.

By taking into account the environment signal and using it in the step of deriving the fatigue score, the reliability of the operator's current drowsiness prediction can be improved. As an example, it is known that the likeliness for the operator to fall asleep (i.e., the fatigue score) increases with darkness and/or at higher temperatures.

In yet another advantageous embodiment of the method, in addition to the machine control signal, the operator signal, and the operator identification signal, an additional collision avoidance signal is used in the step of deriving the fatigue score. This collision avoidance signal is—in an additional method step—received from a collision avoidance system by means of a receiver. The term "receiver" is to be understood herein in a generic meaning as "receiving means" which can, e.g., consist of a cable interface to a separate collision avoidance system or an internal interface to an integrated collision avoidance system. The collision avoidance signal is in particular indicative of at least one of the group of
- an (absolute or relative) position of a fixed or of a movable object, in particular in the vicinity of the operator,
- an (absolute or relative) velocity of a movable object, in particular in the vicinity of the operator,
- an (absolute or relative) yaw rate of a movable object, in particular in the vicinity of the operator,
- a dimension of a fixed or a movable object, in particular in the vicinity of the operator,
- a type of a fixed or a movable object, in particular in the vicinity of the operator,
- a distance between a first movable object and a second fixed or movable object,
- an issuing of a collision warning by means of said collision avoidance system between a first movable object and a second fixed or movable object, and
- an occurrence of a collision between a first movable object and a second fixed or movable object.

By taking into account the collision avoidance signal and using it in the step of deriving the fatigue score, the reliability of the operator's current drowsiness prediction can be improved.

In yet another advantageous embodiment of the method, the current time of day is determined and—in addition to the machine control signal, the operator signal, and the operator identification signal—used in the step of deriving the fatigue score. Thus, the reliability of the operator's current drowsiness prediction can be improved because the likeliness for the operator to fall asleep (and thus the fatigue score) is known to change over the course of the day, e.g., it is known to be likely to increases after a lunch break. It is also possible to consider individual physiological parameters of different operators. For instance, an operator may be known to perform better at night than the average operator.

In yet another advantageous embodiment of the method, in addition to the machine control signal, the operator signal, and the operator identification signal, an additional generic signal is used in the step of deriving the fatigue score. This generic signal is—in an additional method step—loaded from a local memory and/or received via a wirebound or wireless link from a local and/or remote database which is, e.g., located in a base station of a surface mine. The generic signal is in particular indicative of at least one of the group of
- a static site map,
- a past, current and/or future shift schedule of said operator,
- an age of said operator,
- a sex of said operator,
- a training level of said operator, in particular on a particular machine type,
- a (yet achieved) productivity level of said operator,
- a (not yet achieved) productivity goal of said operator,
- a (yet achieved) productivity fulfillment level of said operator,
- a personal trust level in said operator,
- a work history of said operator, e.g., a change from night shift on the previous day to day shift,
- a fatigue model, in particular a personalized fatigue model for said operator taking into account that, e.g., a specific operator is known to be more alert at the beginning of his shift with an alertness minimum after a break),
- an excitement level signal indicative of how interesting the current activity of the operator is (e.g., due to a repetitiveness of his activity), and
- an operator history, e.g., indicative of whether the number of past fatigue incidents for the operator is higher than that of an average operator.

By taking into account the generic signal and using it in the step of deriving the fatigue score, the reliability of the operator's current drowsiness prediction can be improved.

In yet another advantageous embodiment, not only directly "acquired signals" (i.e., signals that are measured by means of a sensor, determined, e.g., from a clock, received, e.g., from a collision avoidance system, or loaded, e.g., from a memory) but also at least one "derived signal" is used in the step of deriving said fatigue score. Such a "derived signal" is itself derived using at least one of the acquired signals. In addition, such a derived signal can optionally also be based on one or more additional acquired signal(s) and/or on a related confidence level(s), (a) weighing factor(s), a previously acquired datapoint(s) for one or more of these signals etc. Advantageous examples for derived signals are
- a PERCLOS signal which is indicative of the percentage of "eyes closed" time for the operator,
- a steering entropy signal, i.e., a statistical signal indicative of the portion of abrupt steering wheel actuations,
- a machine control correction rate signal, i.e., a signal indicative of how many control input corrections such as steering wheel angle changes are input to the machine per time unit,
- a collision avoidance incident rate signal which is indicative of how many collision warnings per time unit are issued by the collision avoidance system,
- an operator reaction time signal, e.g., indicative of how long the operator needs to react in response to an incident and/or to a genuine or false alarm signal, and
- a behavioral peculiarity signal indicative of behavioral deviations of the operator from an "average operator" in a specific situation.

By taking into account one or more derived signals and using it/them in the step of deriving the fatigue score, the reliability of the operator's current drowsiness prediction can be improved.

In another advantageous embodiment of the method the fatigue score is selected from a group of at least 10 distinct possible values, in particular from a group of at least 50 distinct possible values, particularly from a group of at least 100 distinct possible values. Thus, a plurality of possible fatigue scores enables a more precise mapping of different operator drowsiness states.

As another aspect of the invention, a drowsiness detection device for deriving a fatigue score which is indicative of a current drowsiness state of an operator of a machine comprises a first sensor for measuring at least one machine control signal (see above) which is indicative of a control input to the machine from said operator, a second sensor, in particular comprising a camera, for measuring at least one operator signal which is indicative of a physiological and/or of a behavioral state of said operator, and a control unit adapted to carry out the steps of a method for deriving a fatigue score as described above.

Such a drowsiness detection device can be attacked to the operated machine or to equipment of the operator, in particular, it can be fixedly attached to a movable object such as in a truck's or excavator's cabin in a surface mine. Then, a fatigue score indicative of a current drowsiness state of the machine's operator can be more easily derived which enhances the personnels' safety.

Advantageously, such a drowsiness detection device further comprises an override switch for temporarily disabling the device, e.g., for privacy reasons. It is also possible to transmit an override switch operation to a base station. Then, further steps can be foreseen, e.g., the operator can be advised that he has to assume extended liability for fatigue related accidents when the device is switched off.

As yet another aspect of the invention, a computer program element comprises computer program code means for performing a method for deriving a fatigue score as described above when executed on a control unit. Thus, the method can be more easily implemented using such a computer program element.

Remarks:

The described embodiments similarly pertain to the devices, the methods, and the computer program element. Synergetic effects may arise from different combinations of the embodiments although they might not be described in detail.

Throughout the description, the term "acquired signal" can relate to at least one of the group of the machine control signal,
the operator signal,
the operator identification signal,
the navigation signal,
the environment signal,
the time of day,
the collision avoidance signal, and
the generic signal.

Any one or any combination/any subset of this signal/these signals can also be termed "acquired signal(s)".

BRIEF DESCRIPTION OF THE DRAWINGS

Embodiments of the invention are described in the following detailed description. Such description makes reference to the annexed drawings, wherein.

DETAILED DESCRIPTION OF THE DRAWINGS

Figure 1:
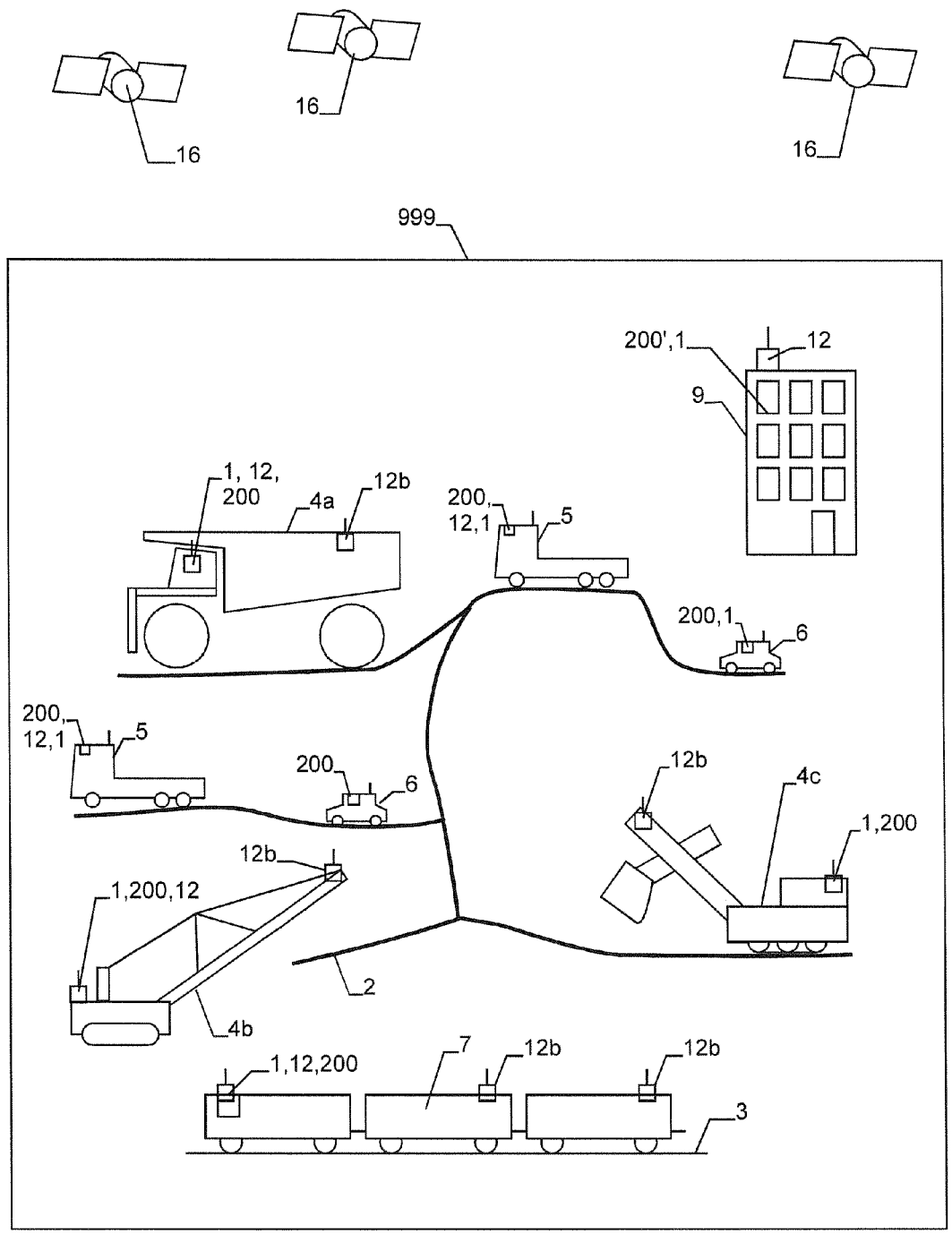
FIG. 1 shows a schematic representation of a surface mine 999 with movable object 4a, 4b, 4c, 5, 6, and 7, and a fixed object 9 (building), wherein each movable object 4a, 4b, 4c, 5, 6, and 7 contains a drowsiness detection device 200 according to the invention.

FIG. 1 schematically depicts a surface mine 999 with movable objects 4a, 4b, 4c, 5, 6, and 7 to each of which embodiments of the inventive drowsiness detection device 200 are attached. Typically, such a surface mine 999 covers a large area, e.g., in the range of square kilometers, with a network of roads 2 and other traffic ways, such as rails 3. A plurality of fixed and movable objects 4a, 4b, 4c, 5, 6, 7 and 9 is present in the mine, such as:

Large vehicles, such as haul trucks 4a, cranes 4b, or excavators 4c. Vehicles of this type may easily weigh several hundred tons, and they are generally difficult to control, have very large braking distances, and a large number of blind spots that the operator 1 (i.e., the driver 1 in case of vehicles) is unable to visually monitor without monitoring aids, such as, e.g., outside cameras with cabin mounted display monitors.

Medium sized vehicles 5, such as regular trucks. These vehicles are easier to control, but they still have several blind spots and require a skilled operator 1.

Small vehicles 6. Typically, vehicles of this type weigh 3 tons or less. They comprise passenger vehicles and small lorries.

Trains 7.

All the above objects may qualify as movable objects 4a, 4b, 4c, 5, 6, and 7. A further type of object within the mine is comprised of stationary obstacles, such as temporary or permanent buildings 9, open pits, boulders, non-movable excavators, stationary cranes, deposits, etc. Those objects qualify as "fixed objects".

The risk of accidents in such an environment is high. In particular, the large vehicles can easily collide with other vehicles or obstacles. For this reason, one, more or all objects in the surface mine 999 are provided with a collision avoidance system 12, 12b that supports the generation of collision warnings for the personnel on the site, and in particular for operators 1 of the movable objects and/or the shift supervisor 1 in the fixed building 9, thereby reducing the risk of collisions and accidents. As known to the skilled person, each movable object may include a collision avoidance system 12, 12b comprising a receiver for a radio based positioning system interacting with satellites 16. These collision avoidance systems 12, 12b communicate to collision avoidance systems 12, 12b of other objects in a wireless manner, in particular by radio signals. Preferably, each collision avoidance system 12, 12b comprises a GNSS (the abbreviation GNSS stands for "Global Navigation Satellite System") for identifying its position, i.e., the position of the assigned movable object or at least a movable part of the object in the case of the collision avoidance systems 12b. Such a GNSS can comprise a GPS system or a Galileo system. Other types are possible as well such as pseudolite systems, a WiFi-based Real Time Location System (RTLS), etc. Alternatively or in addition, distances and/or positions (via triangulation methods) can be measured using runtime measurement devices such as radio detection and ranging device, a light detection and ranging device, a sound detection and ranging device or an active RFID ranging device, and/or signal strength measurement devices.

Further, the collision avoidance system 12, 12b comprises a radio transceiver or circuit for exchanging data with other radio transceivers belonging to other objects. Hence, the collision avoidance system 12, 12b preferably receives positional signals through the GNSS receiver and exchanges data derived therefrom via the transceiver with the transceivers of other objects in order to calculate relative positions and probabilities for collisions. In short, each collision avoidance system 12, 12b obtains positional, velocity, and other data derived from a signal from the GNSS receiver. This data allows determining the objects own position and speed and is stored in a "status dataset". The status dataset also contains a unique identifier (i.e. an identifier unique to each of the collision avoidance systems 12, 12b used on the same site). The status dataset is emitted as a radio signal through the transceiver of the collision avoidance system 12. At the same time, the transceiver receives status datasets from other objects, especially from neighboring objects and therefore can calculate a relative distance to the other object(s) by subtracting its own position coordinates from those of the other object(s).

Nonetheless the presence of the collision avoidance systems 12, 12b, it has been found that the risk of severe accidents increases with drowsy (e.g., tired) operators 1 of the movable objects 4a, 4b, 4c, 5, 6, and 7. Therefore, each cabin of each movable object 4a, 4b, 4c, 5, 6, and 7 houses a drowsiness detection device 200 according to the invention. The fixed object 9 also comprises a drowsiness detection device 200' which acts as a base station and enables a monitoring of the drowsiness states of the operators 1 of the movable objects 4a, 4b, 4c, 5, 6, and 7 by the shift supervisor 1 in the building 9.

Figure 2:
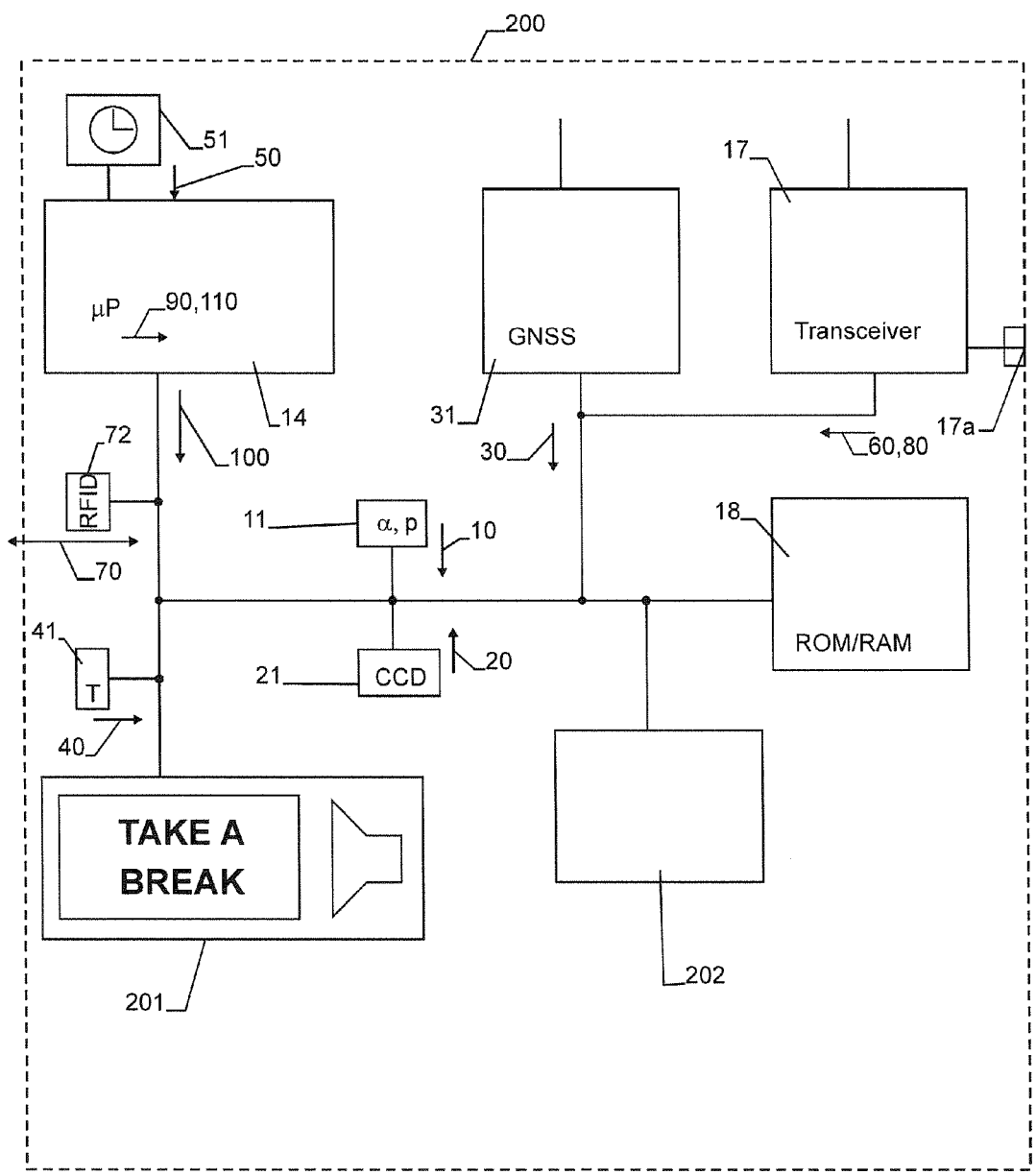
FIG. 2 is a block diagram of a drowsiness detection device 200 according to the invention.

A block diagram of such a drowsiness detection device 200 is schematically shown in FIG. 2: The drowsiness detection device 200 comprises a control unit 14 comprising, e.g., a microprocessor, which controls the operation of the system and is adapted to carry out the necessary steps to derive a fatigue score 100 indicative of the current drowsiness state of the driver 1 (see FIG. 3).

Optionally, the drowsiness detection device 200 can be integrated with the separate collision avoidance system 12 which systems can then share multiple resources (not shown in FIGS. 1 and 2).

The drowsiness detection device 200 can also itself have impact on the operation of the collision avoidance system 12: In case, for example, an outside camera on a truck transmits a relevant scene to a display monitor in the operator's cabin prior to generating a collision warning, and provided the control unit 14 of the drowsiness detection device 200 detects a high alert state (i.e., a low fatigue score 100) of the operator, the issuance of a collision warning may be suppressed given that the operator's attention already is drawn to the relevant display.

The control unit 14 accesses a memory 18 that comprises program code as well as other datasets, e.g., in form of various acquired signals, parameters, weighing factors, and previously stored signals.

The drowsiness detection device 200 further comprises first sensors 11 (a steering wheel angle sensor and a brake pedal position sensor) for measuring machine control signals 10, i.e., a steering input angle and a brake pedal position and vehicle braking system pressure values that the operator inputs to the movable object 4a, 4b, 4c, 5, 6, and 7. It should be noted here that—although not shown in detail—the steering wheel angle sensor could be replaced and/or augmented by a yaw rate sensor such as a gyroscope measuring a yaw rate of the object and calculating the steering wheel angle from the measured yaw rate. Thus, the yaw rate sensor could also be regarded as a "first sensor 11" measuring a "machine control signal 10".

Furthermore, it comprises second sensors 21, i.e., two cameras acquiring images of the driver 1 from different angles and with different zoom factors, for measuring operator signals 20 indicative of physiological and behavioral states of the driver 1. One camera is directed to the face of the driver from the direction of the dashboard of the vehicle and is adapted to measure an eyelid closing state, a pupil diameter, and a mouth closing state of the operator 1. The second camera takes a profile picture of the operator 1 from the side to assess the operator's body posture and distraction level.

The measured machine control signals 10 are continuously stored in the memory 18 and at a later time thus become "previously stored signals". Thus, the acquired signals 10 can be used during the derivation of the fatigue score 100 as live signals at the current time and as historical datapoints in future fatigue score derivations.

Other second sensors 21 can be present as well for monitoring at least part of an area of activity of the operator 1, e.g., part or all of the operator's cabin. The sensor may again be an optical sensor, e.g., an IR sensor, or a third camera 21. Any picture or a sequence of pictures taken by such sensor 21 may be supplied to the control unit 14 which may then by means of an evaluation module interpret the picture/sequence of pictures for assessing a reaction of the operator 1 in response to, e.g., a collision warning from the collision avoidance system 12. Information extracted from such data by means of the control unit 14 may, for example, be that the operator 1 has not changed position in response to a collision warning. In another embodiment, the sensor 21 may also be a runtime measurement sensor 21 for monitoring a certain space in the operator's cabin, which space is considered to be taken by the operator 1 in case of a collision warning, e.g. the space in front of a specific display monitor of the collision avoidance system, the space in front of an emergency button, the space in front of control elements, or similar. In case it is detected by the control unit 14 that someone enters this space in response to the collision warning, this event may be classified as an appropriate reaction of the operator which proves the alertness of the operator 1, thus leading to a lower fatigue score 100.

In an even more sophisticated approach, a sensor 21 may be arranged and capable of identifying an operator's face. Then, the system aims at identifying if an operator looks— e.g., in response to a collision warning—into the right direction (viewing direction). Again, the right direction may be a direction towards, e.g., a display monitor which is provided for transmitting pictures from a camera filming the outside of the movable object 4a, 4b, 4c, 5, 6, or 7, and specifically filming a scene of the impeding collision. For example, one or more cameras may be mounted at the outside of the movable object at different locations in order to scan the entire space around the movable object 4a, 4b, 4c, 5, 6, or 7. In case of a collision warning, it may be preferred that the camera is selected for displaying its pictures on the display monitor in the operator's cabin which is directed at the area the other object approaches from. The control unit 14 may also comprise a facial recognition module which in particular may be a piece of software for extracting facial information from a picture taken by a conventional camera 21 or a camera 21 operating in the infrared light spectrum, for example. The collision avoidance system's display monitor need not necessarily display a scene from the outside of the movable object 4a, 4b, 4c, 5, 6, or 7 but may display, for example, rules of conducts for the operator 1 to handle the impeding collision, or any other relevant information for the operator 1, e.g., more information about the impeding collision, more information on resolving the impeding collision, etc. In this respect, the display monitor may contain one or more screens, or, in another embodiment, contains one or more light signs, LEDs, etc (not shown).

Optionally, e.g., also blood pressure and a pulse rate of the operator 1 can be measured by an additional sensor 21 (not shown in FIG. 2).

Furthermore, each operator 1 is equipped with a personalized RFID-enabled badge (not shown in FIG. 2) which exchanges an operator identification signal 70 with an RFID-transceiver 72 on the drowsiness detection device 200. Thus, the operator 1 can be uniquely identified.

The measured operator signals 20 are also stored in the memory 18 of the drowsiness detection device and later become "previously stored signals". Thus, the acquired signals 20 can be used during the derivation of the fatigue score 100 at the current time and in the future.

The current time of day 50 is determined from a radio controlled clock 51 and used by the control unit 14 as input parameter for a personalized fatigue model for deriving the operator's fatigue score 100.

Navigation signals 30 from a GNSS receiver 31 (i.e., a third sensor 31 which is independent from a collision avoidance system's GNSS for failsafe operation) are indicative of the respective movable object's current position and velocity and are also used in the step of deriving the operator's fatigue score 100. Although not shown here, it would also be possible to receive the movable object's current position and velocity directly from the vehicle's own collision avoidance system 12, 12b.

As a specific example, the scenario of the speed of a movable object 4a, 4b, 4c, 5, 6, or 7 in the surface mine 999 exceeding a threshold (or exceeding a threshold for a certain period of time) may point towards a drowsy operator and thus towards a higher fatigue score 100 for the operator 1. The same may be true for an operator 1 going at a certain speed, e.g., for a certain period of time, that is too low and in particular lower than a threshold which threshold preferably denotes an unusual low speed for a certain situation or for a certain position of the movable object 4a, 4b, 4c, 5, 6, or 7. The situation and/or the position of the movable object 4a, 4b, 4c, 5, 6, or 7 can thus also be taken into account in the derivation of the fatigue score 100, e.g., for determining the value of the speed thresholds. The same may be true for an operator 1 showing non-typical acceleration behavior. For example, sudden braking maneuvers may point towards a drowsy driver 1 and thus lead to a higher fatigue score 100. This is on the one hand measurable by means of the brake pedal position sensor 11 and on the other hand by means of the movable object's speed via the speed-related navigation signal 30. The corresponding signals 10 and 30 are then combined. Hence, the acceleration derived from the position and/or speed measurements may serve as an indicator for a drowsy operator 1, especially when the positive acceleration is below a first threshold, or when it exceeds a second threshold; or, when the negative acceleration is below a first threshold or exceeds a second threshold, which also may hint to unusual braking activities.

In addition, a fourth sensor 41 measures a surrounding light level and air temperature as environment signals 40. These environmental signals 40 are used in the below described step of deriving the fatigue score 100 for the operator 1. As an example, low light combined with high temperature conditions increase the probability for a higher fatigue score 100.

As an additional input signal, a transceiver 17 with a cable interface 17a is adapted to receive collision avoidance signals 60 from the object's own (via cable interface 17a) and remote (via wireless transceiver 17) collision avoidance systems 12 of the fixed and movable objects 4a, 4b, 4c, 5, 6, 7, and 9. It would also be possible to receive the collision avoidance signals 60 solely from the object's own collision avoidance system 12 via cable interface 17a (thus bypassing the transceiver 17) when this collision avoidance system 12 is aware of all the relevant collision avoidance data, i.e., own collision avoidance data and remote collision avoidance data from remote collision avoidance systems 12 (not shown).

Specifically, here, distances between two objects 4a, 4b, 4c, 5, 6, 7, and 9 as well as issued collisions warnings from the collision avoidance systems 12, 12b of the respective objects 4a, 4b, 4c, 5, 6, 7, and 9 are received by the transceiver 12 or cable interface 17a and used for deriving the fatigue score 100.

It was found by the applicant, that either the distance values or data derived therefrom may represent an indicator of the drowsiness, or, conversely the alertness of the operator 1. For example, in a scenario of vehicles driving in a row, if a distance of the vehicle containing the drowsiness detection device 200 to a preceding vehicle is too low, i.e., the distance is identified to be below a lower threshold, a conclusion may be that this kind of handling of the vehicle may result from a drowsy or fatigued operator 1. The same may be true in case the distance to the other object becomes too large, i.e., it is above a higher threshold, which may indicate that the operator 1 is not alert enough either. Generally, the lower threshold is preferably smaller than the higher threshold. It is emphasized that it is not necessarily required to implement both criteria. Subject to the setup of the drowsiness detection device 200, e.g., the distance may only be compared to a single threshold.

Also a rate of collision warnings received as collision avoidance signal 60 from the collision avoidance systems 12 may be an indicator for a drowsiness state of the operator 1. The more collision warnings are generated in a specified period of time from a certain collision avoidance system 12, 12b, the drowsier the respective operator 1 seems to be, thus leading to a higher fatigue score 100.

It is also possible to take a reaction of the operator 1 in response to a received collision warning from the collision avoidance systems 12, 12b as an indicator for the drowsiness state and thus to the fatigue score 100 of the operator 1. In short, such a collision warning preferably includes a visual or an audible warning to the operator 1, wherein the output unit for such a warning of the collision avoidance system 12 may be one or more of a display or a speaker, preferably arranged in the area of activity of the operator 1 which preferably may be an operator's cabin. Then, a reaction of the operator 1 in response to the collision warning is monitored by means of the cameras 21 via the operator signals 20. This may also include identifying that no event occurs that can be taken as a reaction of the operator 1. In case the operator 1 is drowsy or even asleep, he may completely ignore the collision warning from the collision avoidance system 12, 12b such that the absence of a reaction may be taken as a strong indicator for a drowsy or fatigued operator 1 and thus leading to a rather high fatigue score 100, e.g., 98 of 100. The control unit 14 may automatically detect such reactions. The steering wheel angle sensor 11 and/or the brake pedal sensor 11 may also contribute: As an example, any rapid deflection of the steering wheel in response to the collision warning may indicate a drowsy operator 1 scared by the collision warning, especially when additional information is brought into context herewith, e.g., when the abrupt steering wheel deflection takes the vehicle into a direction towards the other object and not away from it. No or a too small deflection of the steering wheel may also indicate a drowsy operator 1 in view of an upcoming collision wherein a steering into a certain direction could have reasonably been expected. Any rapid braking in response to the collision warning may indicate a drowsy operator 1 being scared by the collision warning. Missing, too late, or a too small amount of braking may be interpreted as the operator 1 being drowsy enough not to react to the collision warning sufficiently, especially when in view of the collision scenario a sharp breaking could have reasonably been expected.

The wireless transceiver 17 also serves another purpose: In addition to receiving the collision avoidance signals 60 from neighboring collision avoidance systems 12, 12*b*, also generic signals 80, i.e., a personalized fatigue model which is indicative of how fatigued a specific operator 1 is in dependence of the current situation and an operator history (comprising, e.g., a number of past fatigue alarms for the specific operator) are loaded/received from a database which is remotely located in the building 9. By loading generic signals 80 from a remote database, more personalized information for the operator 1 of the movable object 4*a*, 4*b*, 4*c*, 5, 6, or 7 is taken into account for deriving his fatigue score 100.

The loading is achieved via a data connection between the transceiver 17 and the transceiver 17' of the drowsiness detection device 200' in the building 9 which is in principle very similar to the drowsiness detection device 200 discussed here, except that the first sensors 11 are not a brake pedal sensor or a steering wheel angle sensor but a computer keyboard and mouse monitoring sensor measuring keyboard strokes and mouse movements of the shift supervisor 1. Furthermore, the drowsiness detection device 200' acts as a base station for all the drowsiness detection devices 200 attached to movable objects 4*a*, 4*b*, 4*c*, 5, 6, and 7. Thus, the shift supervisor 1 in the building 9 is able to monitor the fatigue scores 100 of the operators 1 in the movable objects 4*a*, 4*b*, 4*c*, 5, 6, and 7.

The thus loaded generic signals 80 are then stored in the memory 18 of the drowsiness detection device 200 and later become "previously stored signals". Thus, the generic signals 80 can be used during the derivation of the fatigue score 100 at the current time and in the future.

Using current and previously stored machine control signal 10 and operator signals 20, two additional derived signals 90, i.e., a steering entropy signal and a PERCLOS signal are derived by the control unit 14. In addition to these derived signals 90, confidence levels 110 indicative of an accuracy and a validity of the underlying derived signals 90 are computed. If the confidence level 110 of a derived signal drops below a threshold, the drowsiness detection device 200 tries to remove outliers from the underlying signals based on statistical methods. Depending on the confidence levels 110 for the specific signals, weighing factors w_i with i=10, 20, 30, 40, 50, 60, 70, 80, 90 (see FIG. 3) are also adapted with which the specific signals contribute to the derivation of the fatigue score 100.

The drowsiness detection device 200 furthermore comprises a visual and acoustic warning panel 201 for issuing an acoustic and a visual alarm signal to the operator 1 when the derived fatigue score 100 increases above a threshold, e.g., 50 out of 100. Furthermore, this warning signal is also transmitted to the building 9 by means of the transceiver 17 such that further measures can be initiated, e.g., the shift supervisor 1 in the building 9 can via VHF radio communicate an instruction to the operator 1 to take a break. Additionally, or instead, the fatigue score 100 may be displayed to the operator, e.g. by means of color coded status LED, or as a number representing a level of drowsiness (0 . . . 100). A diligent operator may use this information to plan a break.

In another embodiment, the drowsiness warning may be taken as a trigger for requesting an active input of the operator 1. Hence, an input unit (not shown) may be provided, e.g., in form of a switch which may also be referred to as a deadman switch, which the operator 1 is supposed to press within a given time starting from the drowsiness warning. In case the control unit 14 detects that the input unit is not operated within this interval in time, an emergency signal may be issued which emergency signal is adapted to trigger one or more of the following activities: Reducing the speed of the vehicle; stopping the vehicle; generating an acoustic or a visual warning.

Furthermore, the drowsiness detection device 200 comprises an override switch 202 for temporarily disabling the device. For privacy protection purposes, the operator 1 is enabled to switch off the drowsiness detection device 200. In one embodiment, the input unit may not only electronically switch off the drowsiness detection device 200 but may also mechanically inhibit the drowsiness detection device 200 to work. For example, the lenses of the cameras 21 can be automatically covered in order to become inoperable when the device is switched off. Such means may enhance the credibility of the site operator towards the operators 1. However, it is preferred that such deactivation is logged in the memory 18 and/or the base station such that later on it can be proven that the drowsiness detection device 200 was deactivated for a certain period in time. For example, it is assumed that the operator 1 may switch off the drowsiness detection device 200 during a break. However, it is preferred that the drowsiness detection device 200 is switched on again automatically when a state of the movable object 4*a*, 4*b*, 4*c*, 5, 6, or 7 is detected that indicates an upcoming operation and/or a movement of the object. In another embodiment, a change in the identity of the operator may cause a reactivation of the drowsiness detection device 200.

Figure 3:
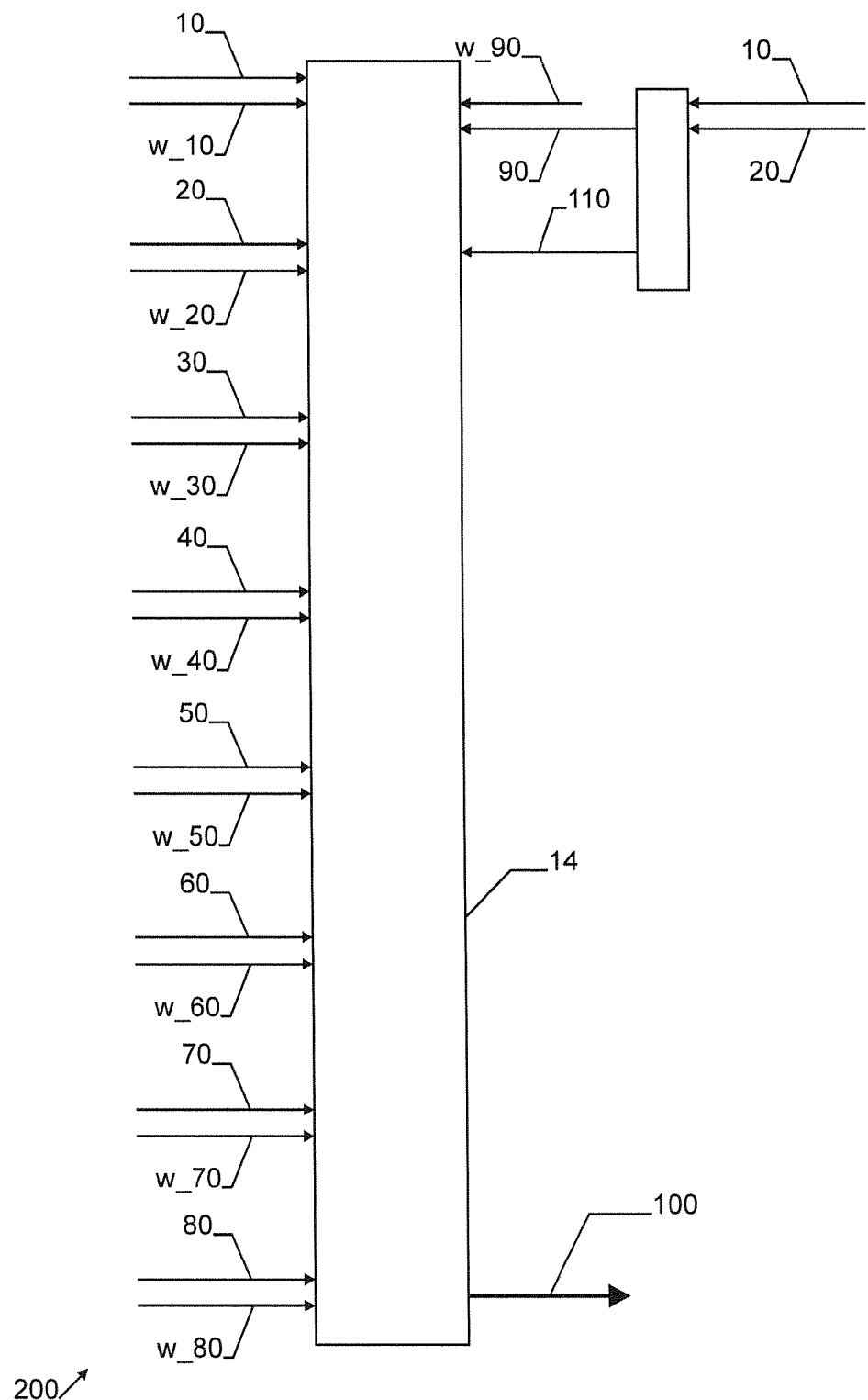
FIG. 3 shows a block diagram for combining a plurality of signals 10, 20, 30, 40, 50, 60, 70, 80, 90, weighing factors w_10, w_20, w_30, w_40, w_50, w_60, w_70, w_80, w_90, and confidence levels 110 for deriving a fatigue score 100 according to the invention.

FIG. 3 shows a block diagram for combining a plurality of signals S_i=10, 20, 30, 40, 50, 60, 70, 80, 90, weighing factors w_i=w_10, w_20, w_30, w_40, w_50, w_60, w_70, w_80, w_90, and confidence levels 110 for deriving a fatigue score 100 according to the invention. In short, the different signals, weighing factors, and confidence levels are combined in the drowsiness detection device 200, specifically in its control unit 14, and the fatigue score 100 which is indicative of the operator's current drowsiness state is derived.

The easiest way of combining the signals is to calculate a weighted sum, i.e.

$$FS = \sum_i w_i \cdot S_i$$

with FS being the fatigue score 100, w_i being the weighing factors as functions of the confidence levels 110, and S_i being the signals.

The fatigue score 100 in this implementation can take values between 0 ("fully alert") and 100 ("sleeping"). Thus, the hazard of fatigue-related accidents can be severely decreased.

It is emphasized, that certain functions of the drowsiness detection device 200 (such as, e.g., facial feature recognition) that are realized in software or firmware may be executed in separate processors of the drowsiness detection device 200, e.g., the control unit 14 and the various sensors 11, 21, 31, 41. However, in another embodiment, these functions may be executed only in the control unit 14.

The invention claimed is:

1. A method for deriving a fatigue score which is indicative of a current drowsiness state of an operator, the method comprising steps of:
   measuring, by means of a first sensor, at least one machine control signal which is indicative of a control input from said operator to a machine,
   measuring, by means of a second sensor, at least one operator signal which is indicative of a physiological and/or a behavioral state of said operator,
   determining an operator identification signal for uniquely identifying said operator and for taking personal characteristics of said operator into account by means of a personalized fatigue model for improving a precision of the derivation of said fatigue score,
   loading from a local memory and/or receiving via a wirebound or wireless link from a remote database at least one generic signal which is indicative of said personalized fatigue model for said uniquely identified operator by means of said operator identification signal,
   wherein the personalized fatigue model is indicative of how at least two of said machine control signal and operator signal contribute to the derivation of the fatigue score, and
   deriving, using said machine control signal, said operator signal, and said operator identification signal, said fatigue score which is indicative of said current drowsiness state of said uniquely identified operator,
   wherein said step of deriving said fatigue score comprises a personalized weighing of at least two of said machine control signal and said operator signal.

2. The method of claim 1 wherein said operator is an operator of a movable object, and wherein said method comprises a further step of:
   measuring, by means of a third sensor, at least one navigation signal of said movable object, which navigation signal is indicative of at least one of the group of
   a position,
   a velocity,
   an orientation, and
   a yaw rate
   of said movable object,
   wherein said at least one navigation signal is used in said step of deriving said fatigue score.

3. The method of claim 1 comprising a further step of:
   measuring, by means of a fourth sensor, at least one environment signal which is indicative of at least one of the group of
   a light level,
   a noise level,
   a temperature, and
   an air humidity level,
   wherein said at least one environment signal is used in said step of deriving said fatigue score.

4. The method of claim 1 comprising a further step of:
   determining a time of day,
   wherein said determined time of day is used in said step of deriving said fatigue score.

5. The method of claim 1 comprising a further step of:
   receiving, by means of a receiver, at least one collision avoidance signal from a collision avoidance system, which collision avoidance signal is indicative of at least one of the group of
   a position of a fixed or of a movable object,
   a velocity of a movable object,
   a yaw rate of a movable object,
   a dimension of a fixed or a movable object,
   a type of a fixed or a movable object,
   a distance between a first movable object and a second fixed or movable object,
   an issuing of a collision warning by means of said collision avoidance system between a first movable object and a second fixed or movable object, and
   an occurrence of a collision between a first movable object and a second fixed or movable object,
   wherein said collision avoidance signal is used in said step of deriving said fatigue score.

6. The method of claim 1 wherein said step of determining said operator identification signal comprises:
   a receiving of a wireless transmission from a badge which is personalized for said operator, and/or
   a reading of a badge which is personalized for said operator and/or
   an entering of a unique identification phrase for said operator and/or
   a recognition of a physiological feature which is unique for said operator.

7. The method of claim 1 comprising a further step of:
   loading or receiving at least one additional generic signal which is indicative of at least one of the group of
   a static site map,
   a shift schedule of said operator,
   an age of said operator,
   a sex of said operator,
   a training level of said operator, in particular on a particular machine type,
   a productivity level of said operator,
   a productivity goal of said operator,
   a productivity fulfillment level of said operator,
   a personal trust level in said operator,
   a circadian rhythm of said operator,
   an excitement level signal, and
   an operator history,
   wherein said generic signal is used in said step of deriving said fatigue score.

8. The method of claim 1 wherein said operator is an operator of a movable object and wherein said at least one machine control signal comprises at least one of the group of:
   a steering input angle,
   a brake pedal position,
   a gas pedal position,
   a retarder activation state,
   a turn indicator state, and
   a horn activation state.

9. The method of claim 1 wherein said at least one operator signal is indicative of a physiological state of said operator and comprises at least one of the group of:

a pupil diameter,
a blood pressure,
a pulse rate,
a body temperature,
an electroencephalogram,
a skin conductance level, and
a blood glucose level
of said operator.

10. The method of claim 1 wherein said at least one operator signal is indicative of a behavioral state of said operator and comprises at least one of the group of:
   an eyelid closing state,
   a mouth closing state,
   a viewing direction,
   a head orientation,
   a focal point position,
   a body posture, and
   a distraction level
   of said operator.

11. The method of the claim 9, comprising at least a first operator signal and a second operator signal, wherein the first operator signal is indicative of a physiological state of said operator,
   wherein the second operator signal is indicative of a behavioral state of said operator, and
   wherein said first and said second operator signals are used in said step of deriving said fatigue score.

12. The method of claim 1 comprising a further step of:
   deriving, using at least one acquired signal, at least one derived signal,
   wherein said derived signal is used in said step of deriving said fatigue score.

13. The method of claim 12 wherein said at least one derived signal is selected from the group consisting of:
   a percentage of eye closure (PERCLOS) signal,
   a steering entropy signal,
   a machine control correction rate signal,
   a collision avoidance incident rate signal,
   an operator reaction time signal, and
   a behavioral peculiarity signal.

14. The method of claim 1 comprising a further step of:
   at a first time storing an acquired and/or derived signal in a memory which signal at a later second time becomes a previously stored signal,
   wherein said previously stored signal is used in said step of deriving said fatigue score at said second time.

15. The method of claim 1 further comprising a step of:
   deriving at least one confidence level for an acquired and/or derived signal,
   wherein said confidence level is used in said step of deriving said fatigue score.

16. The method of claim 1 wherein said step of deriving said fatigue score comprises a weighing of all acquired and/or derived signals.

17. The method of claim 1 comprising a further step of: removing at least one outlier from at least one acquired and/or derived signal.

18. The method of claim 1 comprising a further step of: issuing an acoustic and/or a tactile and/or a visual alarm signal when said fatigue score increases above a threshold.

19. The method of claim 1 comprising a further step of: transmitting, by means of a transmitter, a warning signal, when said fatigue score increases above a threshold.

20. The method of claim 1 wherein said fatigue score is selected from a group of at least 10 distinct values, or from a group of at least 50 distinct values, or from a group of at least 100 distinct values.

21. The method of claim 1 wherein an acquired signal comprises at least one of the group of:
   the machine control signal,
   the operator signal,
   the operator identification signal,
   a navigation signal,
   an environment signal,
   a time of day,
   a collision avoidance signal, and
   a generic signal.

22. The method of claim 14, wherein said previously stored signal is used in addition to an acquired and/or derived signal at said second time in said step of deriving said fatigue score at said second time.

23. A drowsiness detection device for deriving a fatigue score indicative of a current drowsiness state of an operator comprising:
   a first sensor for measuring at least one machine control signal which is indicative of a control input to a machine from said operator,
   a second sensor for measuring at least one operator signal which is indicative of a physiological and/or a behavioral state of said operator, and
   a control unit configured to:
      determine an operator identification signal for uniquely identifying said operator and for taking personal characteristics of said operator into account by means of a personalized fatigue model for improving a precision of the derivation of said fatigue score,
      load from a local memory and/or receiving via a wirebound or wireless link from a remote database at least one generic signal which is indicative of said personalized fatigue model for said uniquely identified operator by means of said operator identification signal,
      wherein the personalized fatigue model is indicative of how at least two of said machine control signal and operator signal contribute to the derivation of the fatigue score, and
      derive, using said machine control signal, said operator signal, and said operator identification signal, said fatigue score which is indicative of said current drowsiness state of said uniquely identified operator,
      wherein said step of deriving said fatigue score comprises a personalized weighing of at least two of said machine control signal and said operator signal.

24. The drowsiness detection device of claim 23 further comprising an override switch for temporarily disabling the device.

25. A non-transitory computer program element comprising computer program code for performing, when executed on a control unit, the steps of:
   measuring, by means of a first sensor, at least one machine control signal which is indicative of a control input from said operator to a machine,
   measuring, by means of a second sensor, at least one operator signal which is indicative of a physiological and/or a behavioral state of said operator,
   determining an operator identification signal for uniquely identifying said operator and for taking personal characteristics of said operator into account by means of a personalized fatigue model for improving a precision of the derivation of said fatigue score, loading from a local memory and/or receiving via a wirebound or wireless link from a remote database at least one generic signal which is indicative of said personalized fatigue model for said uniquely identified operator by means of said operator identification signal, wherein the personalized fatigue model is indicative of how at least two of said machine control signal and operator signal contribute to the derivation of the fatigue score, and deriving, using said machine control signal, said operator signal, and said operator identification signal, said fatigue score which is indicative of said current drowsiness state of said uniquely identified operator, wherein said step of deriving said fatigue score comprises a personalized weighing of at least two of said machine control signal and said operator signal.

* * * * *